(12) United States Patent
Lim

(10) Patent No.: US 9,004,935 B2
(45) Date of Patent: Apr. 14, 2015

(54) SAFETY PLUG DEVICE FOR HIGH-VOLTAGE BATTERY

(71) Applicants: Hyundai Motor Company, Seoul (KR); Kia Motors Corporation, Seoul (KR)

(72) Inventor: Hae Kyu Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 20 days.

(21) Appl. No.: 13/899,918

(22) Filed: May 22, 2013

(65) Prior Publication Data

US 2014/0162497 A1 Jun. 12, 2014

(30) Foreign Application Priority Data

Dec. 7, 2012 (KR) .................. 10-2012-0141779

(51) Int. Cl.
H01R 4/50 (2006.01)
B60L 3/04 (2006.01)
H01R 13/629 (2006.01)
H01R 13/627 (2006.01)
H01R 13/639 (2006.01)
H01H 85/20 (2006.01)
H01H 85/58 (2006.01)
H01H 85/02 (2006.01)

(52) U.S. Cl.
CPC ................ *B60L 3/04* (2013.01); *H01R 13/629* (2013.01); *H01R 13/6271* (2013.01); *H01R 13/639* (2013.01); *H01H 85/2045* (2013.01); *H01H 85/58* (2013.01); *H01H 2085/025* (2013.01); *Y10S 439/911* (2013.01)

(58) Field of Classification Search
USPC ........ 439/620.26, 620.34, 484, 347, 181, 911
See application file for complete search history.

(56) References Cited

U.S. PATENT DOCUMENTS

| 6,878,005 | B2 * | 4/2005 | Varone et al. ................. 439/347 |
| 6,979,213 | B1 * | 12/2005 | Mauney et al. ................ 439/157 |
| 7,005,996 | B2 * | 2/2006 | Cabrera et al. ................ 340/639 |
| 7,226,316 | B2 * | 6/2007 | Wu .......................... 439/607.44 |
| 7,281,937 | B2 * | 10/2007 | Reed et al. .................... 439/352 |
| 7,309,250 | B2 * | 12/2007 | Reed et al. .................... 439/352 |
| 7,530,850 | B2 | 5/2009 | Maguire et al. |
| 2011/0003495 | A1 * | 1/2011 | Kuo ............................. 439/155 |
| 2012/0294571 | A1 * | 11/2012 | Kappla et al. .................. 385/76 |

FOREIGN PATENT DOCUMENTS

JP 11-162445 6/1999
JP 2003-100386 A 4/2003

(Continued)

Primary Examiner — Neil Abrams
Assistant Examiner — Travis Chambers
(74) Attorney, Agent, or Firm — Mintz Levin Cohn Ferris Glovsky and Popeo, P.C.; Peter F. Corless

(57) ABSTRACT

A safety plug device that is disposed in a high-voltage battery to interrupt power supply. The device includes a female housing, a male housing, and a grip part. The female housing includes a terminal part and the male housing is equipped with a fuse and is removably coupled to the female housing. The grip part is slidable on the male housing in forward and backward directions, is simultaneously coupled to the male housing in a vertical direction, and is equipped with an interlock pin connected to an interlock connector at a rear end thereof. In particular, the grip part slides forward to release the interlock pin and to be coupled to the male housing, to allow the grip part and the male housing to be removed in an upward direction to interrupt the power supply.

4 Claims, 9 Drawing Sheets

(56) References Cited

FOREIGN PATENT DOCUMENTS

| JP | 2004007920 A | 1/2004 |
| JP | 2009-054329 A | 3/2009 |
| KR | 10-0799543 | 9/2007 |
| KR | 10-2012-0027729 A | 3/2012 |

* cited by examiner

SAFETY PLUG DEVICE FOR HIGH-VOLTAGE BATTERY

CROSS-REFERENCE TO RELATED APPLICATION

This application claims under 35 U.S.C. §119(a) the benefit of Korean Patent Application No. 10-2012-0141779 filed Dec. 7, 2012, the entire contents of which are incorporated herein by reference.

BACKGROUND (a) Technical Field

The present invention relates to a safety plug device for a high-voltage battery. More particularly, the present invention relates to a safety plug device for a high-voltage battery, which interrupts a battery power source in electric vehicles or hybrid vehicles during maintenance such as repair or servicing and emergency.

(b) Background Art

Generally, high-voltage batteries and motors of electric vehicles use a high level of voltage much like fuel cell vehicles. Also, hybrid vehicles using two or more power sources use a voltage relatively higher than the operating voltage of typical vehicles. Since the electric or hybrid vehicles use electricity for running the vehicle and other operations, these vehicles typically require a significant number of circuits to which voltage and current higher than those of typical vehicles are applied. Thus, since high-voltage circuits of such electric or hybrid vehicles may injure a serviceman when the vehicles are serviced or repaired, the high-voltage circuits need to be interrupted for the repair work, thus ensuring safety for a serviceman.

Safety plug devices have been proposed to interrupt high-voltage circuits. The safety plug devices include a combination of a safety plug and an interlock. After a high current from high-voltage battery is applied, the safety plug device interrupts the flow of the high current by interrupting a connection between the interlock function and the battery management system (BMS), and prevents generation of arc upon removal of the plug. In particular, the safety plug is configured to interrupt the power supply during emergency and maintenance work by placing a current cut-off switch in the middle of the high-voltage battery, and the interlock is configured to prevent the burning of the battery and the system by preventing the occurrence of arc due to the release of a mechanical contact when the safety plug is removed.

FIG. 1 is an exemplary view of a typical safety plug device. As shown in FIG. 1, the safety plug device includes a plug main body 100 and a plug lever 110 that can be pivoted. The plug main body 100 and the plug lever 110 are interlocked by a locking part 120 and a fixing part 130. Additionally, an interlock 140 is disposed on the front surface of the plug main body 100 to be contactable with the plug lever 110. Thus, when the lever-side fixing part 130 is pushed in the direction of the arrow, showing in FIG. 1, to release the fixing part 130 from the main body-side locking part 120 and then the fixing part 130 rotates 90 degrees in the direction of arrow, the plug lever 110 moves upward, and the interlock is turned off and the current is cut off.

However, since the typical safety plug devices have substantially complicated structures and many components such as a spring added to push the fixing part, manufacturing costs may increase. In addition, since the plug lever needs to be pivoted when the fixing part is pulled, the typical safety plug devices may be substantially difficult to manipulate, and their workability may be reduced.

The above information disclosed in this Background section is only for enhancement of understanding of the background of the invention and therefore it may contain information that does not form the prior art that is already known in this country to a person of ordinary skill in the art.

SUMMARY

The present invention provides a safety plug device for a high-voltage battery, which may secure safety and decrease the number of components of a grip part by applying a slide type grip housing and a pivot type grip lever to a safety plug in which a connector may be removed after turning off the interlock function, and may improve workability by facilitating the interlock removal and the safety plug removal with a manipulation such as pushing and pulling of the grip part.

In one aspect, the present invention provides a safety plug device disposed in a high-voltage battery configured to interrupt power supply, the device may include: a female housing including a terminal part; a male housing equipped with a fuse and coupled to the female housing to be connectable and short-circuitable; and a grip part slidable on the male housing in forward and backward directions, simultaneously coupled to the male housing in a vertical direction, and equipped with an interlock pin connected to the interlock connector at a rear end thereof, wherein the grip part may be configured to slide forward to release the interlock pin and be coupled to the male housing, and the grip part and the male housing may be removed in an upward direction to interrupt the power supply.

In an exemplary embodiment, the grip part may include a grip housing that covers an upper surface and both side surfaces of the male housing and a grip pivotably coupled to a front end of the grip housing by a hinge, and the grip housing may be hooked by the male housing in a vertical direction at a forward position of the grip housing when both protrusion parts of the male housing are fitted into the coupling slits at both front ends of the grip housing.

In another exemplary embodiment, when the grip housing is disposed at a backward position, the hinge part of the grip may be disposed under a protrusion part of the male housing to restrain the grip from pivoting upwardly.

In still another exemplary embodiment, the male housing may include a guide protrusion with a first lock protrusion at a rear side of both side surfaces thereof, and the grip housing of the grip part may have a second lock protrusion lockable in the first lock protrusion while moving along the guide protrusion to guide the grip part and maintain the grip part at a backward position.

In yet another exemplary embodiment, the grip housing of the grip part may have an L-shape guide groove engaged with a fixing pin on a side surface of the female housing to allow the grip housing to be hooked by the female housing in a vertical direction at a backward position and released from the female housing in the vertical direction at a forward position.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
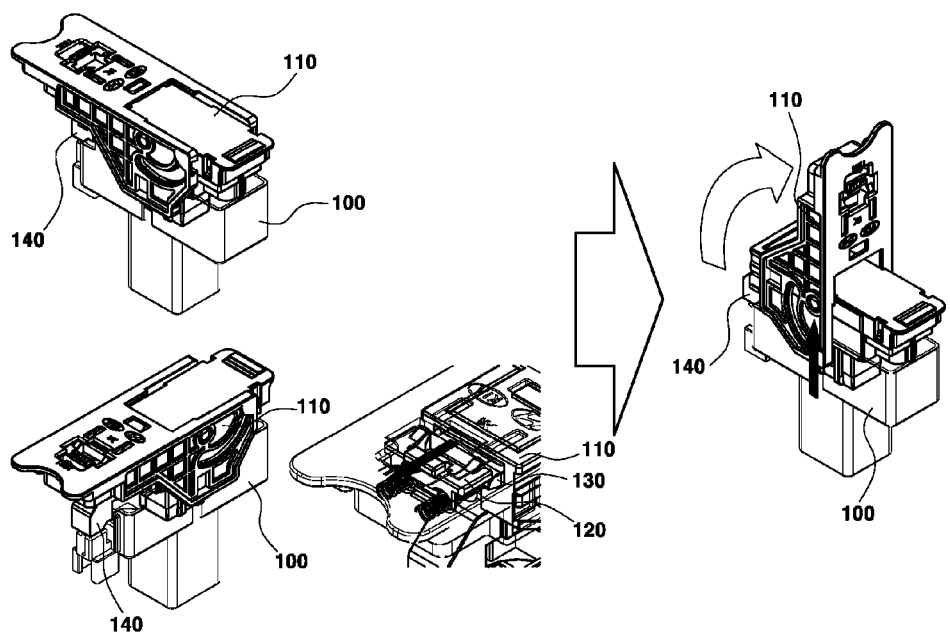
FIG. 1 is an exemplary view illustrating a typical safety plug device according to the related art.

Reference numerals set forth in the Drawings includes reference to the following elements as further discussed below:

| | |
|---|---|
| 10: terminal part | 11: female housing |
| 12: fuse | 13: male housing |
| 14: interlock connector | 15: interlock pin |
| 16: grip part | 17: grip housing |
| 18: hinge part | 19: grip |
| 20: coupling slit | 21: protrusion part |
| 22a, 22b: lock protrusion | 23: guide protrusion |
| 24: fixing pin | 25: guide groove |
| 26: grip aperture | 27: cover |
| 28: interlock housing | 29: battery case |
| 30: aperture | P1: forward position |
| P2: backward position | |

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the accompanying claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings.

Figure 2:
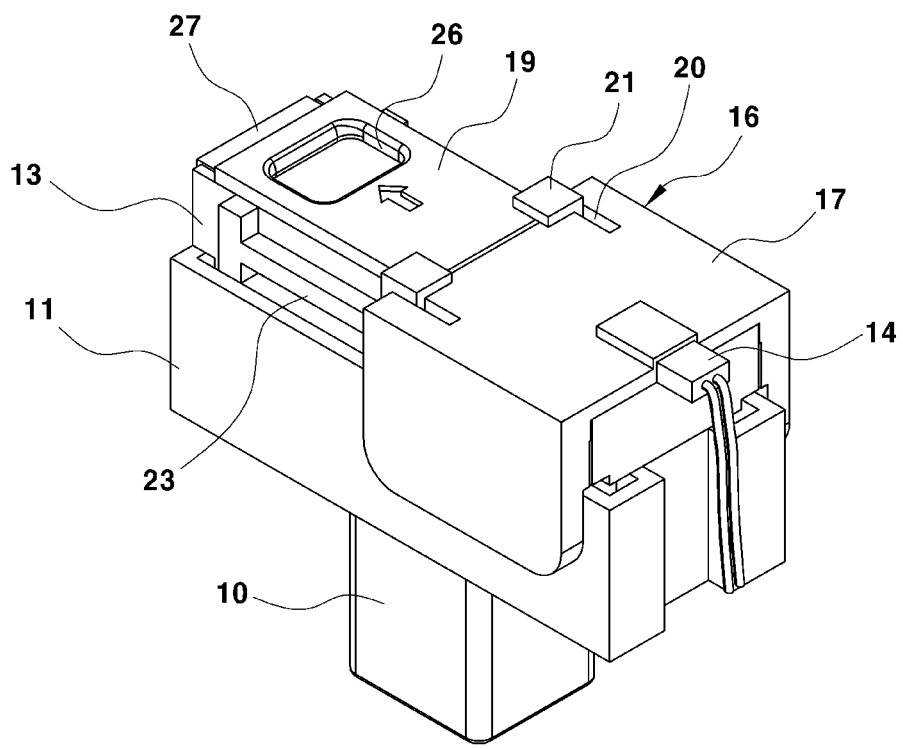
FIG. 2 is an exemplary view illustrating a safety plug device according to an exemplary embodiment of the present invention.
Figure 3A:
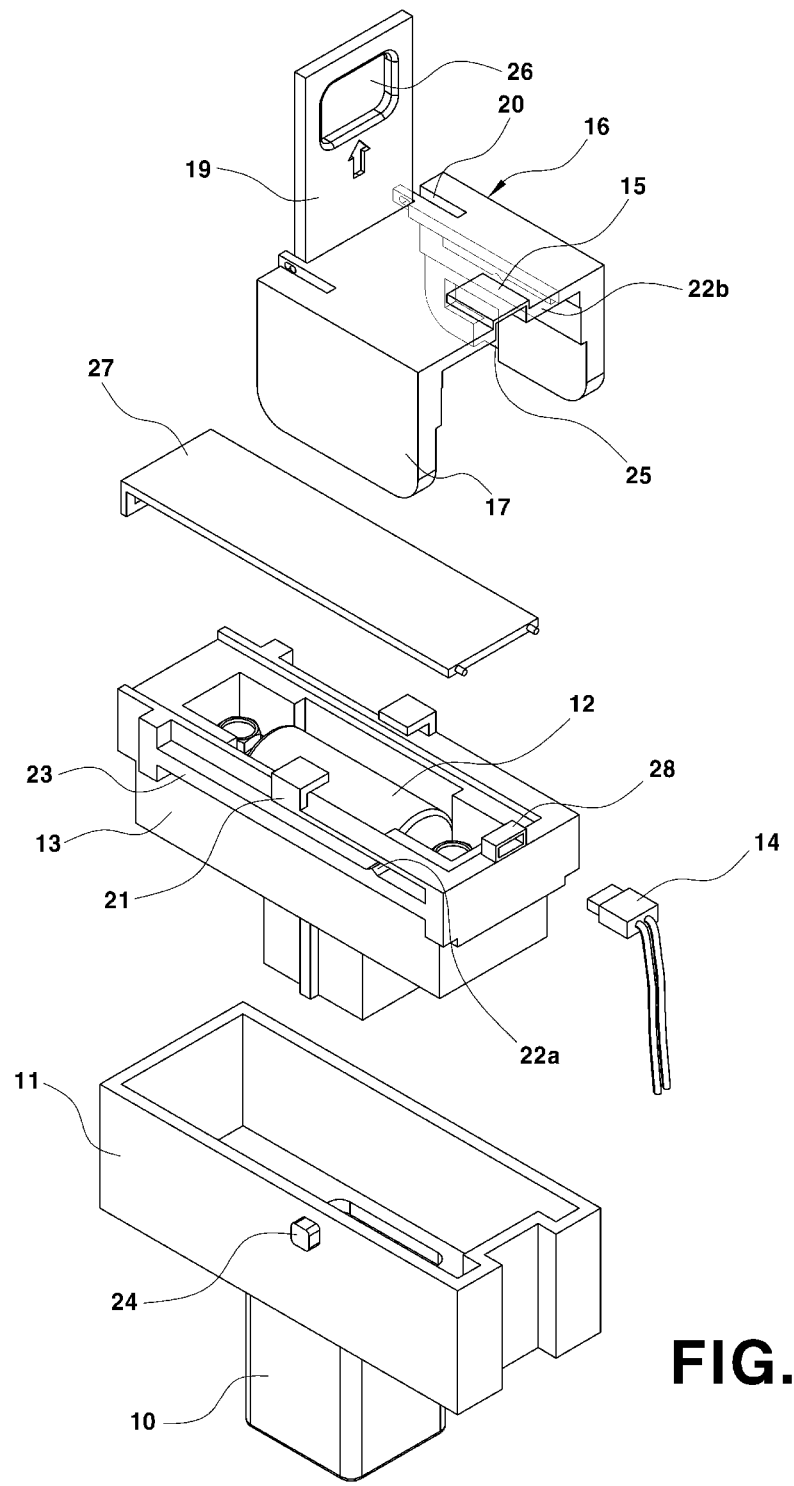
FIGS. 3A and 3B are exemplary detailed views illustrating a safety plug device according to an exemplary embodiment of the present invention.
Figure 3B:
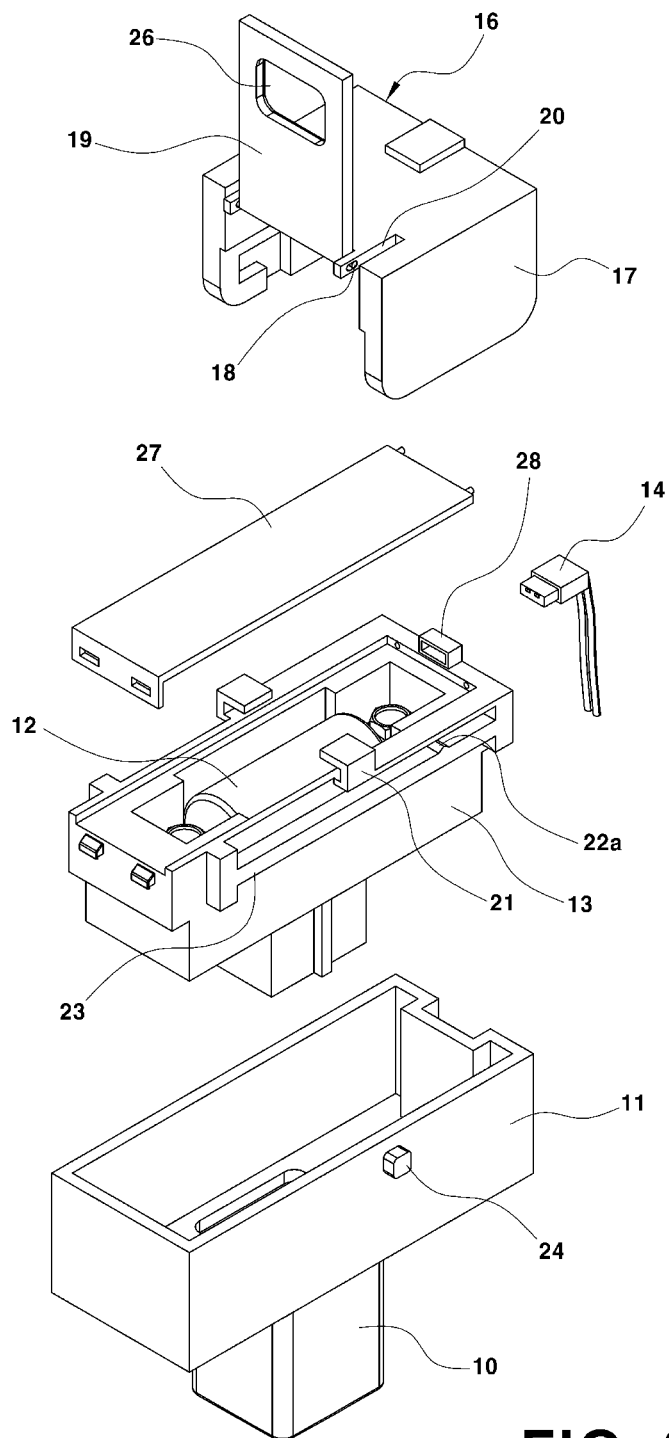

FIG. 2 is an exemplary view illustrating a safety plug device according to an exemplary embodiment of the present invention. FIGS. 3A and 3B are exemplary detailed views illustrating a safety plug device according to an exemplary embodiment of the present invention.

As shown in FIGS. 2, 3A and 3B, the safety plug device may include a female housing 11 connected to a high-voltage battery through a terminal part 10 and a male housing 13 equipped with a fuse 12 and coupled to the female housing 11 to be connectable and short-circuitable. The upper part of the male housing 13 equipped with the fuse 12 may be finished with a cover 27 to protect the fuse 12 inside the male housing 13. In particular, since the electrical connection or short-circuit structure between the female housing 11 and the high-voltage battery and between the male housing 13 and the female housing 11 may be similar to a typical structure according to the related art, a detailed description thereof will be omitted herein.

A grip part 16 may be disposed on the male housing 13. The grip part 16 may be slidable in the forward and backward directions (e.g., X-axis direction of FIG. 2), and may be coupled to the male housing 13 in the vertical direction (e.g., Y-axis direction of FIG. 2). The grip part 16 may include a U-shaped grip housing 17 that covers the upper surface and the both side surfaces of the male housing 13 and a portion of both side surfaces of the female housing 11. In particular, the grip housing 17 may be slidable in the forward and backward directions while covering the male housing 13. Additionally, when the grip housing 17 is removed, the grip housing 17 may be coupled to the male housing 13 in the vertical direction via a protrusion part 17 described later. The grip part 16 may include a grip 19 connected to the front end of the grip housing 17 via a hinge 18 and thus may be able to rotate. In particular, the grip 19 may be removed by a user. For example, the grip 19 may be pivoted to an upright position by an angle of 90 degrees. Then, when a finger is hooked in the grip aperture 26 of the grip 19 and then is pulled upwardly, the male housing 13 including the grip part 16 may be removed.

Particularly, an interlock pin 15 may be integrally installed at the rear end portion of the grip housing 17. An interlock connector 14 extending from a battery management system (BMS) may be connected to the interlock pin 15. Thus, when the grip housing 17 equipped with the interlock pin 15 is moved forward, the interlock connector 14 may be smoothly separated from the interlock pin 15, becoming an interlock off state. In particular, the interlock connector 14 may be fixed within the interlock housing 28 that is disposed on the upper surface of the rear end portion of the male housing 13.

Additionally, a coupling slit 20 having a predetermined length and extending from the front end to the rear side of the grip housing 17 may be formed in the both sides of the front end of the grip housing 17. In response thereto, an L-shaped protrusion part 21 having a vertical plate and a horizontal plate may be disposed at both side surface of the upper part of the male housing 13. Thus, when the grip housing 17 slides forward to a forward position P1, the vertical plate of the protrusion part 21 may be inserted into the coupling slit 20, and simultaneously, the horizontal plate of the protrusion part 21 may downwardly block the upper surface of the grip housing 17. Therefore, the grip housing 17 and the male housing 13 may be hooked by each other in the vertical direction. In particular, when the grip housing is pulled upward, the male housing may also be pulled together.

When the grip housing 17 is located at a backward position P2 on the rear side thereof, since the protrusion is separated from the coupling slit 20, the locking relation between the grip housing 17 and the male housing 13 may be released. In particular, even though the grip housing 17 is pulled, the male housing 3 may not be pulled. In addition, when the grip housing 17 is moved backward to the backward position P2, the hinge 18 connecting the grip housing 17 and the grip 19 may be disposed under the protrusion 21 of the male housing 13. In particular, since the rear end portion of the grip 19 is interfered from the upper side, the grip 19 may not stand upright. As a result, since the coupling relation between the grip housing 17 and the male housing 13 may be released at the backward position P2 of the grip part 16 and the grip 19 may not stand upright, the safety plug may not be removed.

Additionally, a guide protrusion 23 and a pair of lock protrusions 22a may be disposed to slidably move the grip part 16 in the forward and backward directions and maintain the grip part 16 at the backward position P2. The guide protrusion 23 may have a strip shape, and may be disposed in parallel on the both side surfaces of the male housing 13 in the forward and backward directions. The lock protrusion 22a may be disposed at the rear side of the guide protrusion 23.

Another lock protrusion 22b may be disposed on the inner surface of both walls of the grip housing 17, and may be locked with the lock protrusion 22a on the guide protrusion 23 at the backward position P2 while moving along the guide protrusion 23. Thus, when the grip housing 17 is pushed backward, the lock protrusion 22b of the grip housing 17 may slide over the lock protrusion 22a of the guide protrusion 23 and may be hooked by the rear side the lock protrusion 22a. Thus, the grip part 16 may be maintained at the backward position P2.

Additionally, a fixing pin 24 and a guide groove 25 may be included for selective coupling between the grip part 16 and the female housing 11. The fixing pin 24 may be formed on the both side surfaces of the female housing 11, respectively. The guide groove 25 may be formed in the inner surfaces of the both walls of the grip housing 17, respectively. In particular, the guide groove 25 may have an L-shape including a horizontal section and a vertical section that communicate with each other. The vertical section may be downwardly opened. The fixing pin 24 of the female housing 11 may enter the vertical section of the guide groove 25 in the grip housing 17, and may move along the guide groove 25 when the grip housing 17 slidably moves in the forward and backward directions. Thus, when the grip housing 17 is pushed to the backward position P2, the fixing pin 24 of the female housing 11 may be disposed at the front end of the horizontal section of the guide groove 25, and the female housing 11 and the grip housing 17 may form a coupling structure, that restrains the vertical separation of the grip housing 17. Additionally, when the grip housing 17 is pushed to the forward position P1, the fixing pin 24 of the female housing 11 may be disposed at the rear end of the horizontal section of the guide groove 25, i.e., the position communicating with the vertical section. In particular, the coupling between the female housing 11 and the grip housing 17 may be released, and the grip housing 17 may be upwardly separated from the female housing 11.

Figure 4:
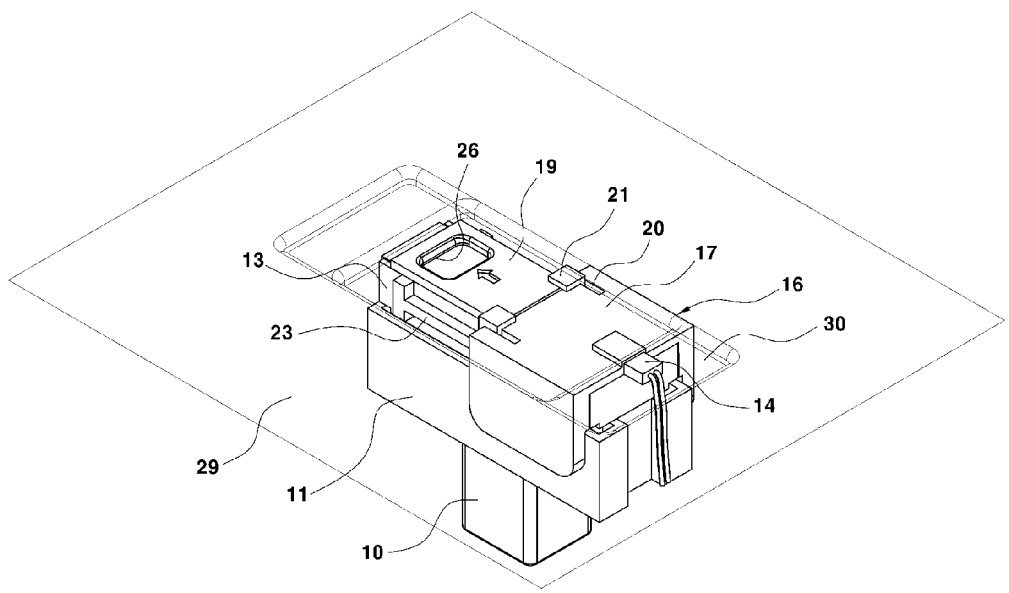
FIG. 4 is an exemplary view illustrating an installation state of a safety plug device according to an exemplary embodiment of the present invention.

FIG. 4 is an exemplary view illustrating an installation state of a safety plug device according to an exemplary embodiment of the present invention. The safety plug device may be installed and removed through an aperture 30 of a battery case.

Hereinafter, the removal process of the safety plug device configured as above will be described as follows.

Figure 5A:
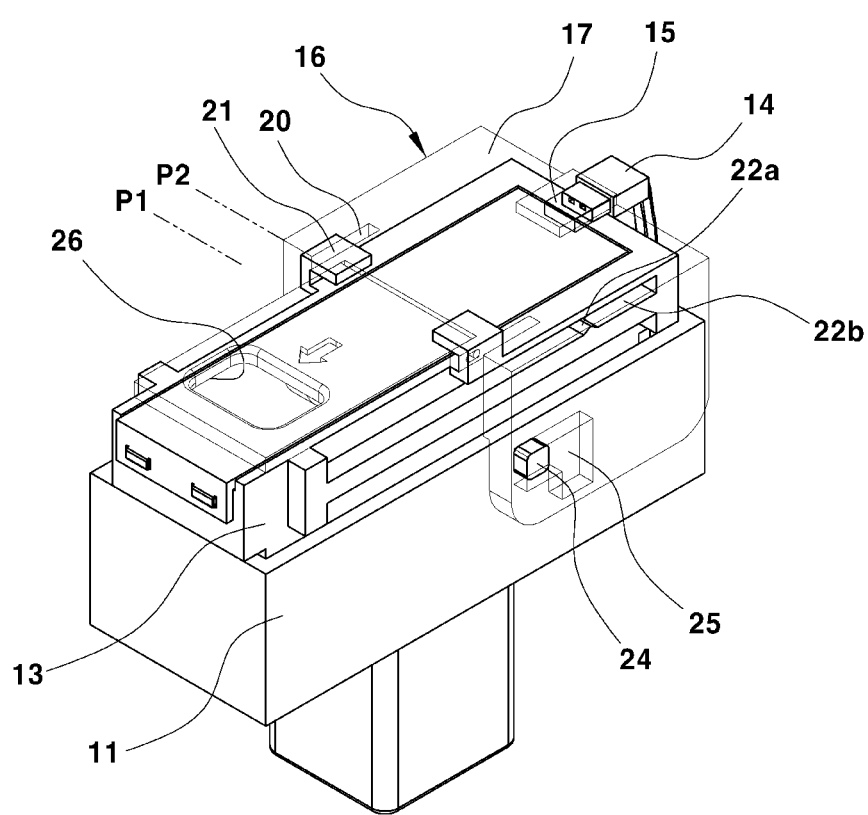
FIGS. 5A through 5D are exemplary views illustrating a removal process of a safety plug device according to an exemplary embodiment of the present invention.

FIGS. 5A through 5D are exemplary views illustrating a removal process of a safety plug device according to an exemplary embodiment of the present invention. FIG. 5A shows a normal use state of the safety plug device (i.e., when the safety plug device is working properly with no short circuit, the safety plug has not been removed).

The grip part 16 may be fixed at the backward position P2 by a locking action between the lock protrusion 22b of the grip housing 17 and the guide protrusion 23 of the male housing 13 in the grip part 16. In particular, the interlock pin 15 and the interlock connector 14 may be connected to each other.

Figure 5B:
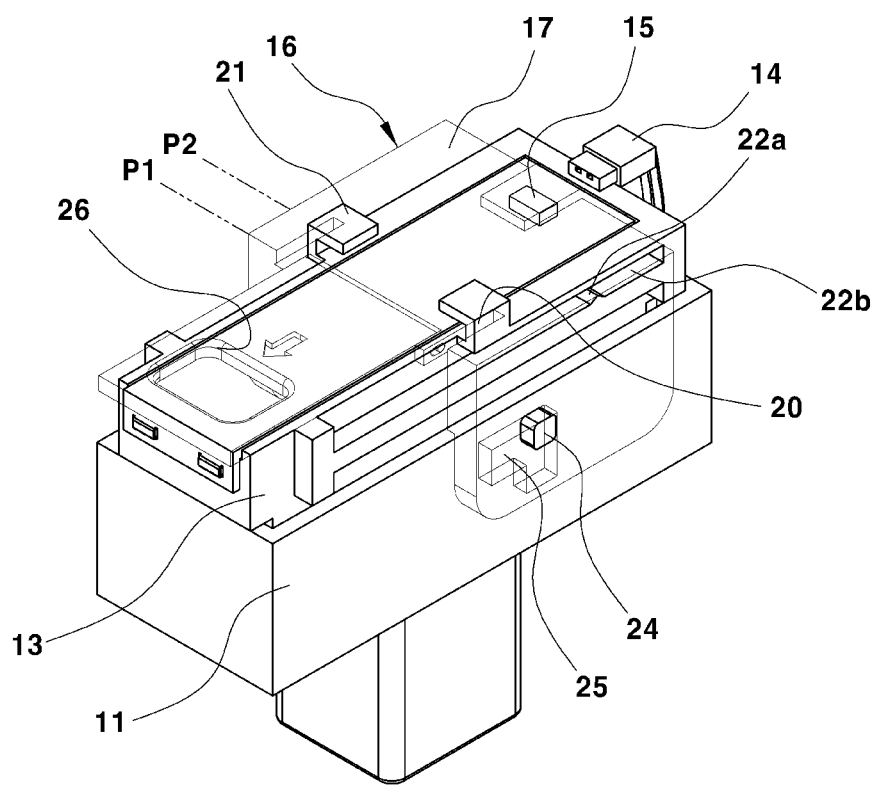
Figure 5C:
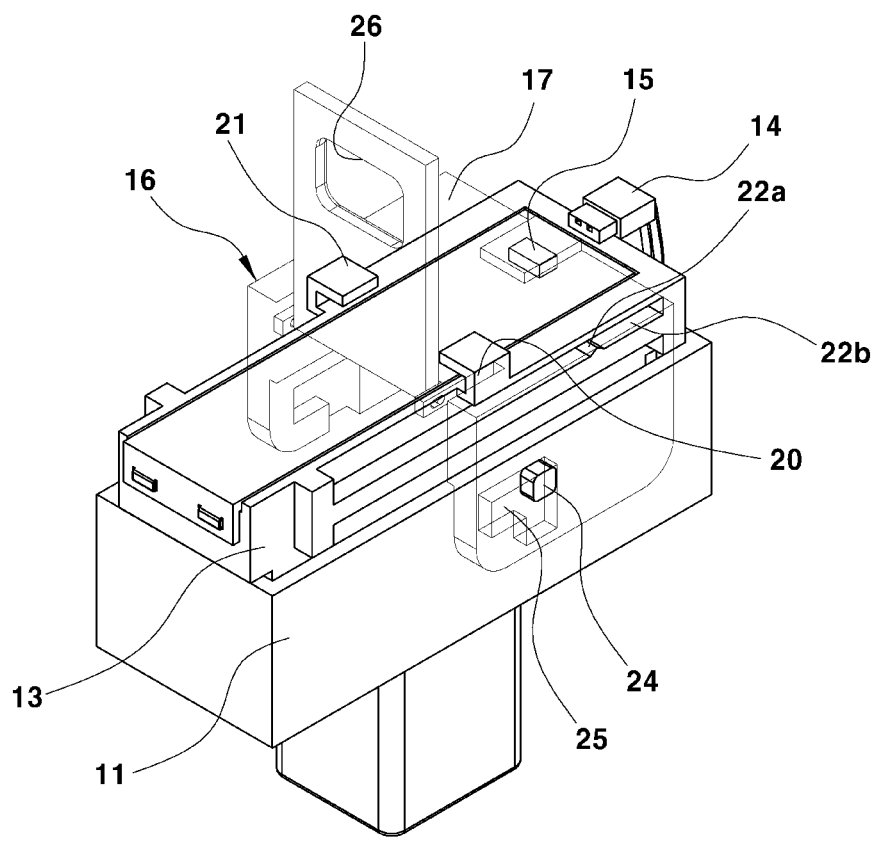
Figure 5D:
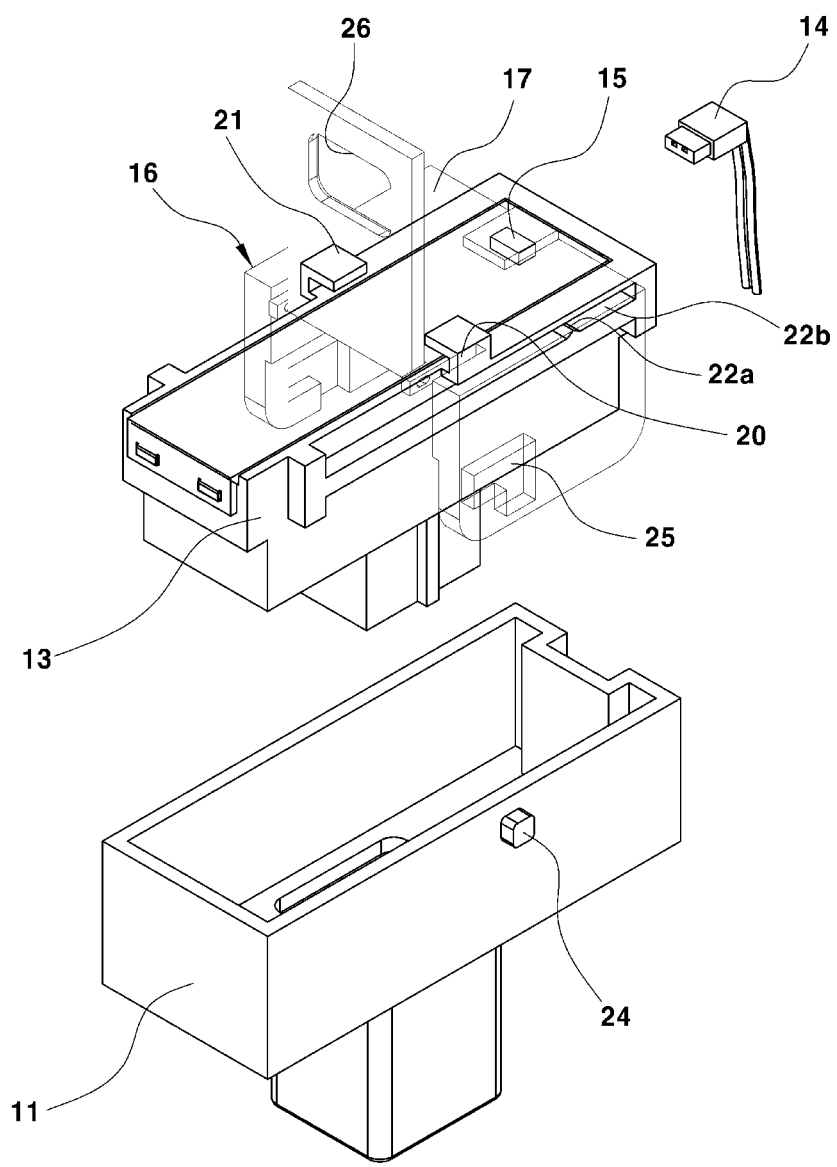

As shown in FIGS. 5B and 5D, the removal process of the safety plug device is shown in steps. When the grip housing 17 of the grip part 16 at the backward position P2 is pushed to the forward position P1, the interlock pin 15 may be separated from the interlock connector 14, and the protrusion part 21 of the male housing 13 may be fitted into the coupling slit 20 of the grip housing 17. In particular, the fixing pin 24 of the female housing 11 may be disposed at the vertical section of the guide groove 25 in the grip housing 17.

Furthermore, when the grip 19 of the grip part 16 is pivoted to the upright position, and is upwardly pulled while a finger (or an object) is hooked in the grip aperture 26, the male housing 13 including the grip part 16 may be separated from the female housing 11, and power supply may be interrupted in concurrence with the removal of the safety plug device. Thus, since the safety plug is removed when the interlock function is in an off-state by sliding the grip part, arc may be prevented, thus securing the safety of the device. In addition, since the safety plug is removed in an upward direction after the interlock function is turned off through sliding of the grip part, the removal process may be more easily performed.

A safety plug device for a high-voltage battery according to an exemplary embodiment of the present invention has the following advantages.

First, an interlock pin may be removed by pushing and pulling a grip part for removal of a safety plug, and the generation of arc may be prevented by allowing an interlock pin to interrupt a current flow in advance.

Second, since the turning-off of the interlock function and the removal of the safety plug may be performed with merely a pushing and pulling of the grip part, the workability may be improved.

Third, since the number of components of the grip part may be reduced, the structural simplification and the cost saving may be achieved.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A safety plug device disposed in a high-voltage battery to interrupt power supply, the device comprising:
    a female housing including a terminal part;
    a male housing equipped with a fuse and removably coupled to the female housing; and
    a grip part slidable on the male housing in forward and backward directions, simultaneously coupled to the male housing in a vertical direction, and equipped with an interlock pin connected to an interlock connector at a rear end thereof,
    wherein the grip part becomes coupled to the male housing and the interlock pin becomes separated from the interlock connector when the grip part is slid forward, to allow the grip part and the male housing to be removed in an upward direction to interrupt the power supply, and the grip part includes:
        a grip housing that covers an upper surface and both side surfaces of the male housing; and
        a grip pivotably coupled to a front end of the grip housing by a hinge, wherein the grip housing is hooked by the male housing in the vertical direction at a forward position of the grip housing when protrusion parts of the male housing are fitted into coupling slits at the front end of the grip housing.

2. The safety plug device of claim 1, wherein when the grip housing is disposed at a backward position, the hinge of the grip is disposed under the protrusion parts of the male housing to restrain the grip from pivoting upwardly.

3. The safety plug device of claim 1, wherein the male housing includes:
    a guide protrusion with a first lock protrusion at a rear side of both side surfaces thereof, wherein the grip housing of the grip part has a second lock protrusion lockable in the first lock protrusion while moving along the guide protrusion to guide the grip part and maintain the grip part at a backward position.

4. The safety plug device of claim 1, wherein the grip housing of the grip part has an L-shape guide groove engaged with a fixing pin on a side surface of the female housing to allow the grip housing to be hooked by the female housing in the vertical direction at a backward position and to allow the grip housing to be released from the female housing in the vertical direction at the forward position.

* * * * *